United States Patent Office 2,718,410
Patented Sept. 20, 1955

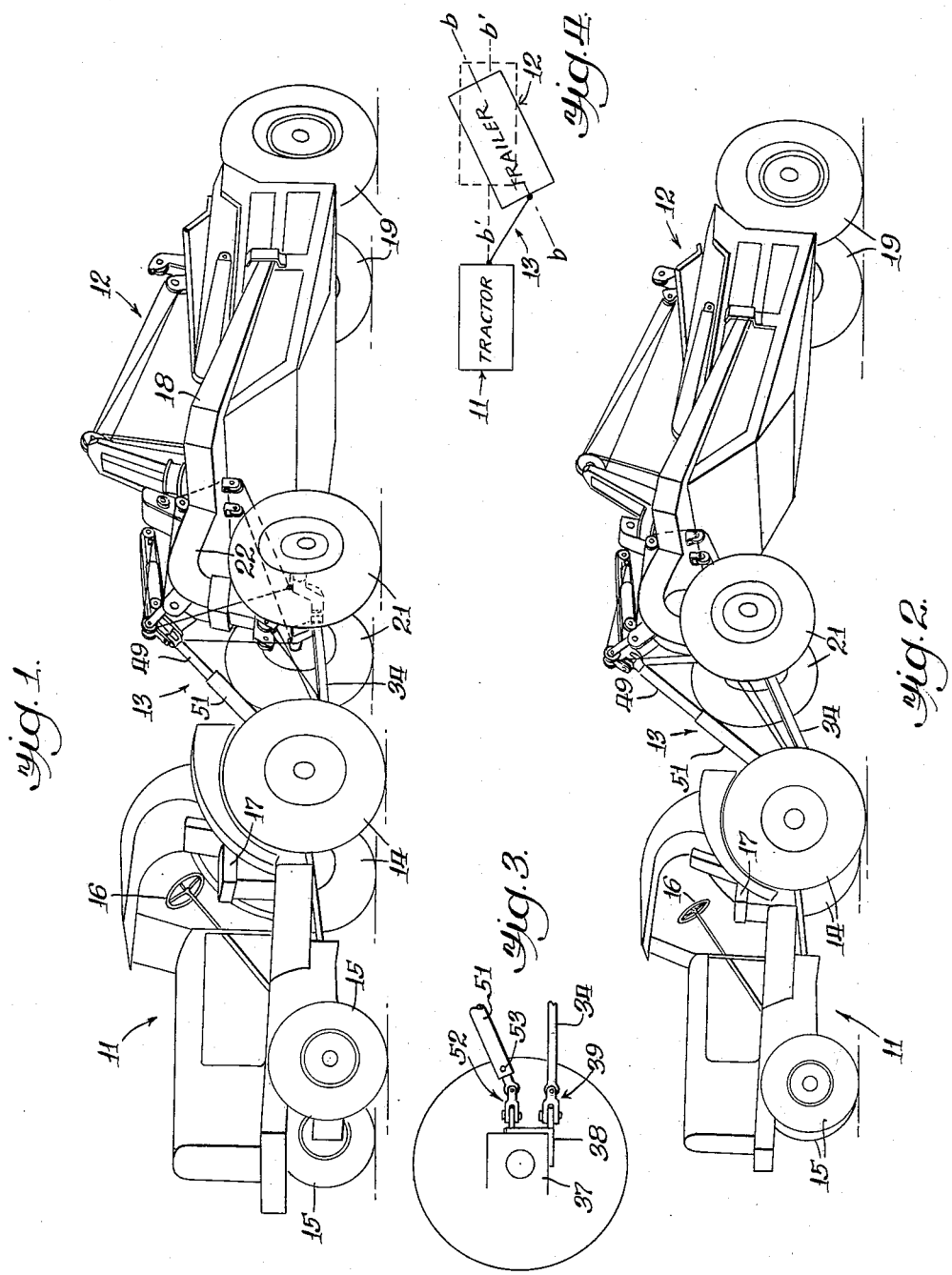

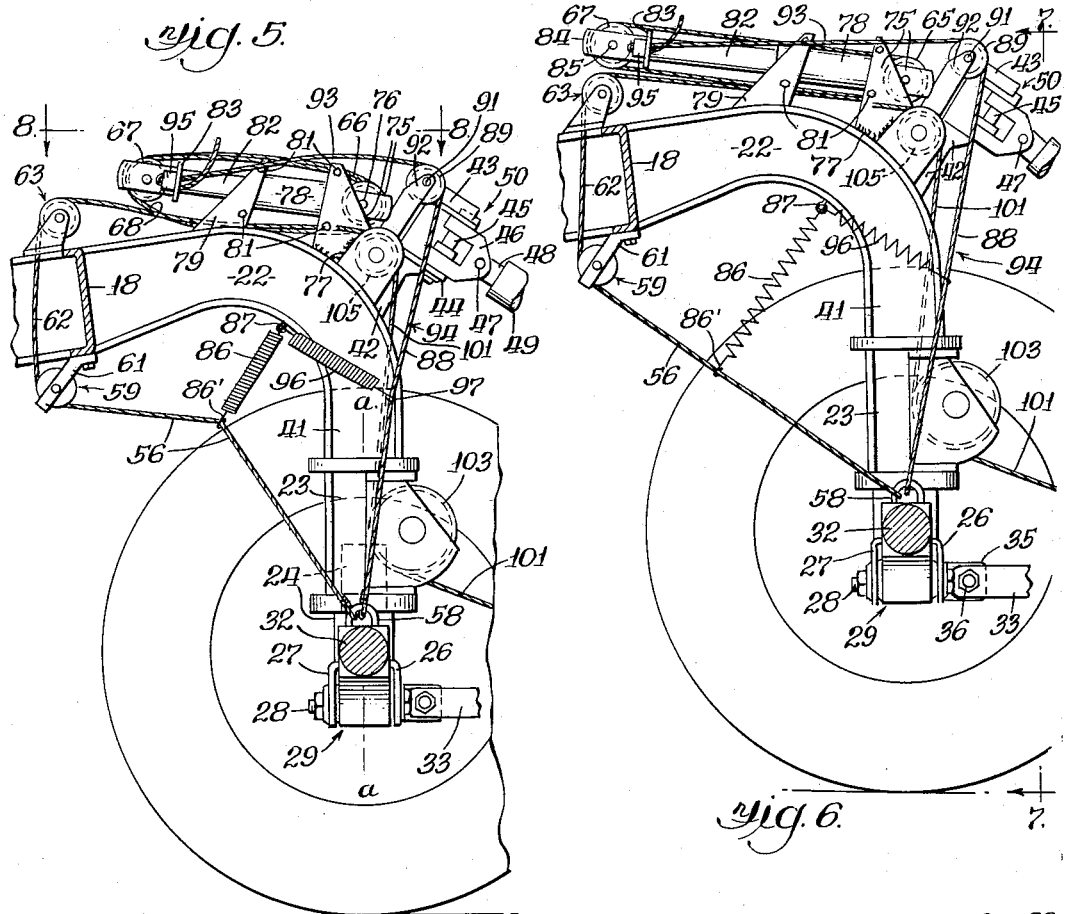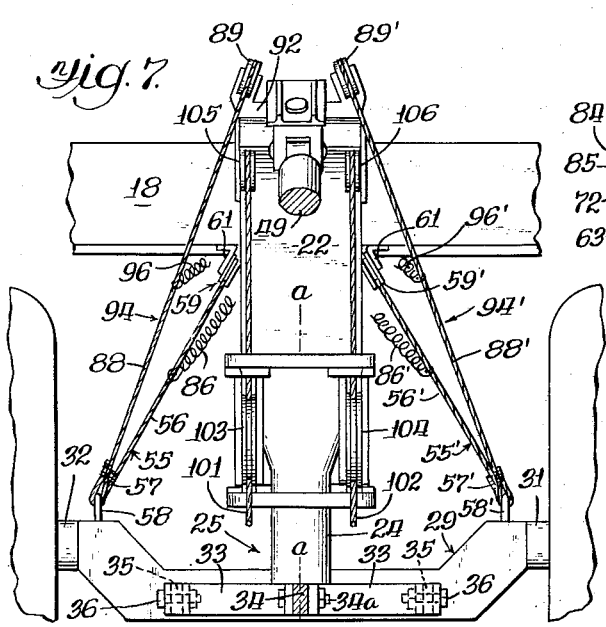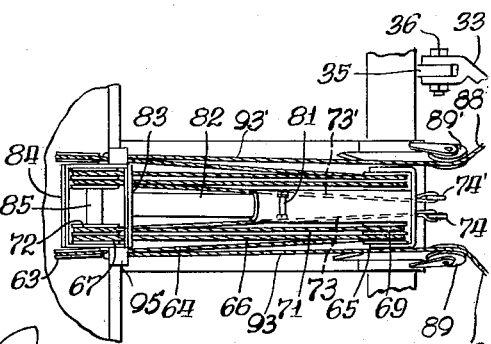

2,718,410

STRAIGHTENING APPARATUS FOR WEIGHT-TRANSFERRING, STEERING AND TOWING HITCH

Lovel Reynolds Simmons, Jackson, Miss.

Application December 4, 1953, Serial No. 396,233

7 Claims. (Cl. 280—406)

This invention has to do with articulated weight transferring hitch structures for connecting a vehicular trailer in towable steering relation with a vehicular tractor, and more particularly concerns means for swinging the hitch structure laterally relatively to the trailer to place such hitch structure substantially within a fore and aft vertical median plane of such trailer and thereby laterally displace the forward end of the trailer while the hitch structure is attached to the tractor.

The present invention has particular utility in association with weight transfer hitch structures employed between a tractor and a trailer as illustrated in my U. S. Patent No. 2,459,098 titled Weight-Transferring Vehicle Coupling or Hitch Structure. Such hitch structures are used in association with a trailer having front and rear wheels for normally supporting the body of this vehicle and any load placed within the body. The front wheels of the trailer are mounted at opposite ends of a transverse axle which is pivotal about a vertical axis to facilitate swinging of this axle to impart steering movement to the front wheels. A tongue which is pivotally connected with the front axle for swinging vertically relatively thereto about a transverse horizontal axis projects horizontally forwardly into connection with a rear portion of the tractor through a universal joint. A second connection between the trailer and the tractor includes an elongated hydraulic ram having one end pivotally connected with a forward upper portion of the trailer and extending downwardly and forwardly into pivotal connection with a rear portion of the tractor through a universal joint. The tongue and the hydraulic ram together with the forward portion of the trailer extending between the vertically spaced connections of the tongue and ram with the trailer constitute a triangular hitch structure through which the trailer is steered and towed by the tractor. Normally the hydraulic ram component of the hitch structure can effect telescopic action both expansively and contractively which enables the front dirigible wheels of the trailer to follow the ground contour while supporting the entire front end of the trailer. During this type of operation the weight transferring hitch structure is in a relaxed condition. It is possible, however, to energize the hitch structure by hydraulically expanding the ram to elongate the leg of the triangle formed thereby which causes the hitch structure to bear down at its front end upon the tractor attendant to transferring weight from the trailer onto the tractor while relieving ground pressure of the trailer front wheels, or, completely lifting these wheels from the ground according to the degree of expansion of the ram.

Inasmuch as the hitch structure can swing laterally about its front end relatively to the tractor and can also swing laterally about its rear end relatively to the trailer, it is possible while the vehicle train is backing to incur a double jackknife arrangement wherein the hitch structure is disposed horizontally angularly both to the tractor and to the trailer. There are times when this double jackknife arrangement or formation makes it difficult to maneuver the vehicle train in a rearward direction over a narrow roadway. The principal object of this invention is the provision of means for swinging the hitch structure and trailer horizontally relatively to one another to place them in a common vertical plane extending lengthwise of the trailer to eliminate one of the angles of the double jackknife and thereby simplify the problem of backing the vehicle train along the desired course.

A more specific object of the invention is the provision of means operable while the hitch structure is energized for lifting the front trailer wheels from the ground and supporting the front end of the trailer by means of the front end of the hitch structure bearing downwardly upon the connection thereof with the tractor, to swing the hitch structure horizontally relatively to the trailer so as to place the hitch structure in a vertical fore and aft median plane of the trailer and thereby shift the front end of the trailer together with the front wheels thereof laterally as the hitch structure comes into straight ahead alignment with the body of the trailer.

A further object is the provision of cable means having normally slack flights connected with the hitch structure and with cable guide means upon the trailer, the cable flights when slack being adapted to permit lateral swinging of the hitch structure for steering the trailer, and means for creating tautness in the cable flights for placing the hitch structure in straight ahead alignment with the body of the trailer.

A further object is the provision of a trailer with a hitch structure and cable flights according to the next preceding object wherein there is a front axle pivotally mounted upon the front end of the trailer body about a vertical axis and rotatively carrying the front wheels at opposite ends thereof, wherein the hitch structure is constrained for swinging with the axle about the vertical axis, and wherein the cable flights are indirectly connected with the hitch structure by respective attachments to the swingable axle.

A further object is the provision of a trailer hitch structure and cable means according to the next preceding object, wherein the front axle is also swingable about a fore and aft horizontal axis relatively to the trailer body, wherein there are additional cable flights connected between opposite end portions of the axle and an upward portion of the trailer body, wherein the additional cable flights are normally slack to facilitate swinging of the axle about the fore and aft horizontal axis, and hydraulic ram means connected with all of the cable flights and operable when expanded to create tautness in the flights whereby the additional cable flights are operable to create a horizontal position of the axle while the front wheels are lifted from the ground and during relative lateral swinging of the trailer and hitch structure about the vertical axis by the tautness created in the first recited cable flights.

The above and other desirable objects inherent in and encompassed by the invention are elucidated in the insuing specification, the appended claims and the annexed drawings, wherein:

Fig. 1 is an elevational view taken in perspective illustrating a tractor, a trailer, a weight transfer hitch structure connecting the tractor and trailer, and cables and operating means therefor embodying a preferred form of the invention adapted to swing the hitch structure laterally relatively to the trailer.

Fig. 2 is a view taken similarly to Fig. 1 but illustrating the hitch structure energized for lifting the front wheels of the trailer from the ground and thereby making it possible for the cables and operating means therefor to swing the hitch structure laterally relatively to the trailer.

Fig. 3 is a fragmentary elevational view showing the rear body portion of the tractor of Figs. 1 and 2 and means for attaching tongue and hydraulic ram elements of the hitch structure to the tractor body.

Fig. 4 is a diagrammatic plan view showing in full lines a double jackknife connection of the tractor and trailer by the hitch structure, and showing in dotted lines the position into which the trailer and hitch structure are relatively swingable to eliminate the jackknife arrangement by creating tautness in the straightening cable flights while the front wheels of the trailer are raised from the ground as illustrated in Fig. 2.

Fig. 5 is a fragmentary side view partly in section of the front end of the trailer together with cable flights at one side thereof and a hydraulic ram for creating tautness in these flights to enable them to cooperate with similar flights at the opposite side of the trailer when they are also made taut for swinging the hitch structure laterally relatively to the trailer body and for effecting a horizontal position of the axle having the front wheels of the trailer mounted upon opposite end portions thereof.

Fig. 6 is a view taken similarly to Fig. 5 but illustrating the ram expanded and the cables operated thereby in their taut condition.

Fig. 7 is a fragmentary front end view of the trailer with the ram plunger and tongue elements of the hitch structure shown in section, the view being taken substantially at the plane indicated by the line 7—7 in Fig. 6.

Fig. 8 is a horizontal fragmentary view directed downwardly upon the hydraulic ram for operating the cables, the view being taken as indicated by the arrows associated with the line 8—8 in Fig. 5.

The invention is illustrated in assembly with a vehicular train comprising a tractor 11 and a trailer 12 in the form of a self-loading scraper connected in towable relation with the tractor by a weight-transferring hitch structure 13. The tractor comprises rear traction wheels 14 and front dirigible wheels 15 conventionally steerable by a steering wheel 16 accessible to an operator upon a seat 17.

The self-loading trailer vehicle comprises a frame 18 supported at its rear end by laterally spaced rear ground-engaging supporting wheels 19 and supported at its front end by dirigible front ground-engaging supporting wheels 21. A front portion of the trailer frame 18 is in the form of a gooseneck 22 with a vertical journal portion 23 at its lower front end; see Figs. 5, 6 and 7. A king pin portion 24 of an axle mounting structure 25 is journaled in the bearing portion 23 for oscillation about a vertical axis a—a. The lower end of the king pin structure 25 has front and back furcations 26 and 27 having a pivot pin 28 secured therein to serve as a pivotal mounting for the mid portion of a front axle 29 with opposite end portions 31 and 32 upon upon which the front wheels 21 are journaled. Tongue-mounting brackets 33 pivotally secured to the front side of the axle 29 by apertured ears 35 and pins 36 have a tongue 34 rigidly assembled therewith by means of bolts 34a. In Fig. 3 the rear body portion 37 of the tractor can be seen to have a hitch attaching structure in the form of a bracket 38 secured thereto. The forward end of the trailer tongue 34 is connected with the bracket 38 through a universal joint structure 39.

Referring once more to Figs. 1, 2, 5 and 6, the upper part of a vertical leg 41 of the gooseneck 22 can be seen to have a mounting mast 42 secured thereto. This mounting mast comprises vertically spaced and forwardly declined furcations 43 and 44 in support of a journal pin 45. A yoke 46 is pivotally mounted upon the pin 45 and is pivotally connected by a pin 47 with the upper end portion 48 of a hydraulic ram plunger 49. The parts 43 through 48 constitute a universal joint structure 50 for attaching the upper end of the hydraulic ram plunger 49 to the front end of the trailer 12. Ram plunger 49 extends into and is telescopically associated with an elongated ram cylinder 51, the plunger 49 and the cylinder 51 constituting a hydraulic ram 49—51. As illustrated in Fig. 3, the lower end of the ram cylinder 51 is universally coupled with the tractor mounting bracket 38 by means of a universal joint generally designated 52. A nipple 53 communicates interiorly with the lower end of the cylinder 51 and is adapted to have a hose (not shown) coupled thereto through which hydraulic fluid is introducable into the lower end of the cylinder 51 at selectable pressure for forcing the plunger 49 telescopically upwardly with respect to the cylinder 51. A suitable source of hydraulic fluid together with control means therefor determining when fluid under pressure is introduced into the lower end of the ram cylinder 51 is disclosed in my U. S. Patent No. 2,459,098.

It can be seen in Figs. 1, 3, 5 and 6 that the hitch structure 13 for interconnecting the tractor and trailer is a triangular configuration comprising a generally vertical leg which includes the vertical part 41 of the gooseneck 22, the tongue 34 and the hydraulic ram 49—51. When there is nominal fluid pressure in the lower end of the ram cylinder the parts of the hitch structure will be essentially relaxed and in the relative positions illustrated in Fig. 1. Because of the universal connections 39 and 52 of the tongue 34 and of the ram 49—51 with the tractor and the universal connection 50 of the ram with the tractor and the pivotal connection of the rear end of the tongue with the trailer front axle 29 through the pivot pins 36, while the hitch structure is relaxed the tractor can turn in any direction relative to the front end of the hitch structure and the hitch structure can swing vertically relatively to the trailer and can also swing horizontally relatively to the trailer frame incident to pivoting the trailer front axle 29 about the vertical king pin axis a—a. This freedom of relative movement between the two vehicles enables the vehicle train to pass over pits and hummocks which are commonly present on off-the-highway surfaces to be traversed by the vehicle train.

By introducing fluid under pressure into the lower end of the ram cylinder 51 and thus linearly expanding the ram 49—51, the leg of the triangle formed by this ram is elongated to distort the triangle. By effecting substantial elongation of the ram to obtain correspondingly substantial distortion of the triangle of the hitch structure the front end of the trailer is elevated sufficiently to raise the front wheels 21 completely from the ground as illustrated in Fig. 2. When the hitch is hydraulically energized to raise or partly raise the front end of the trailer with respect to the ground surface, the hitch structure transfers weight of the trailer from the area of contact of the front wheels 21 with the ground onto the tractor, and principally on to the traction wheels of the tractor for increasing their traction. Normally this weight transferring use of the hitch structure 13 is employed only during an emergency condition in off-the-highway operation when insufficient traction is had by the traction wheels 14 for moving the vehicle train while the trailer rests upon all four of its wheels. Such an emergency condition sometimes arises when the traction wheels 14 encounter a wet slippery surface or when one or more of the wheels of the vehicle train encounter a hummock or drop into a shallow pit. As soon as the emergency is over the vehicle operator will permit exhaust of the pressure fluid from the ram 49—51 to cause the hitch 13 to again assume its relaxed condition illustrated in Fig. 1. It should be realized that considerable weight can be transferred from the trailer onto the tractor for obtaining adequate traction upon the wheels 14 without necessarily completely lifting the wheels 21 from contact with the ground. Most frequently adequate traction is obtained by causing lifting of the front end of the trailer frame only enough to take some of the flex from the lower portion of the tires on the wheels 21 while the tires actually remain in contact with the ground surface to maintain upright stability of the vehicle train.

Backward movement of a vehicle train comprising a normally towed trailer connected to a tractor by a tongue is normally difficult if the backward movement is for a substantial distance during which the vehicle train must follow a predetermined narrow course. Such backward movement sometimes incurs a double jackknife formation as that illustrated in Fig. 4 wherein the hitch structure 13 is swung clockwise relatively to the tractor and swung an equal amount counter-clockwise relatively to the trailer, incident to which a fore and aft median axis b—b of the trailer will be displaced from the position b'—b'. This double jackknife formation can be easily corrected by shifting the trailer back to the dotted line position with its median axis occupying the position b'—b' by energizing the hitch structure 13 to lift the wheels 21 from the ground and thereafter employing means now to be described for swinging the hitch structure counter-clockwise relatively to the trailer while the front end of the hitch structure is supported upon the tractor.

In Figs. 5, 6 and 7 the right side of the trailer can be seen equipped with a cable 55 having a flight 56 with a lower forward end portion 57 attached to an anchor loop 58 on a right end portion of the front axle 29. This cable flight extends upwardly and rearwardly about a cable holding means in the form of a pulley having a frame 61 attached to the trailer frame 18 at the right side of the gooseneck 22. A vertical flight 62 of the cable 55 extends upwardly from the pulley 59 over and about a pulley 63 to a next flight 64 which reaches forwardly to extend about a pulley sheave 65 from which a rearwardly extending flight 66 extends to and about a pulley sheave 67 and then continues forwardly in a flight 68 about a second sheave 69 and again rearwardly in a flight 71 to and about a pulley sheave 72 and then forwardly in a flight 73 to an anchorage 74 on the upper side of the gooseneck 22; see Fig. 8. A frame 75 carries a journal shaft 76 for the pulley sheaves 65 and 69, and this frame 75 is secured to the mast 42 and the gooseneck 22 by welding at 77. The frame 75 also has a hydraulic ram cylinder 78 anchored thereto, and this bracket 75 together with a more rearward bracket 79 on the upper side of the gooseneck together with clamping bolts 81 secure the cylinder 78 rigidly in place upon the gooseneck. A piston rod 82 projecting rearwardly from the rear end of the cylinder 78 carries a cross head 83 to which there is attached a bracket 84 for a journal shaft 85 for the sheaves 67 and 72. A symmetrical structure is provided in that a cable 55' corresponding to the cable 55 is provided on the left side of the trailer, together with sheaves and anchorages corresponding to those associated with the cable 55. The various flights of the cable 55' and the sheaves and anchorages and other parts associated therewith, where shown, are designated by the same respective reference characters with the addition of a prime (').

Normally the hydraulic ram 78—82 is contracted as illustrated in Fig. 5 so the cable flight 56 is relatively slack and this slack cable flight is held against drooping by an expandable spring 86 having a loop 86a formed at the lower end thereof through which the cable flight 56 is freely slidable and connected by an anchorage element 87 at its upper end to the gooseneck 22. A similar spring 86' is similarly associated with the cable flight 56' and similarly anchored to the gooseneck 22. This slackness of the cable flights 56 and 56' enables the tongue 34 and hydraulic ram 49—51 of the hitch structure 13 to swing about the king pin axis a—a attendant to steering the trailer.

Also attached to the anchorage member 58 on the front axle 29 of the trailer is the lower end of a cable 94 of which a flight 88 extends upwardly over a cable holding means in the form of a pulley wheel 89 journaled upon a pin 91 in a frame 92 securely mounted upon the mast 42. A second flight 93 of the cable 94 extends rearwardly from the pulley wheel 89 where it is connected by a clamp 95 to the frame 83 on the rear end of the ram piston rod 82. On the opposite side of the gooseneck 22 a cable 94' has a flight 88' anchored at its lower end to the anchorage 58' on the axle 29 and extends upwardly over a pulley wheel 89' and thence rearwardly for being clamped to the cross head bracket 83 on the rear end of the ram piston rod 82. When the ram is contracted as illustrated in Fig. 5, the cable flights 88 and 88' will also be slack. Cable flight 88 is prevented from drooping by a contracted expandable spring 96 having a loop 97 at its forward end through which the cable flight 88 freely passes and anchored at its rearmost end to the anchorage 87. A spring 96' is similarly associated with the cable flight 88' and similarly connected with the gooseneck 22.

Cables 101 and 102, forming no part of the present invention, extend rearwardly from the tractor about pulley wheels 103 and 104 thence upwardly over pulleys 105 and 106 and thence rearwardly for controlling moveable parts of the self-loading scraper trailer that are unnecessary to describe for illustrating the present invention.

During normal conditions while the trailer is being towed behind the tractor or being moved backwardly by pushing force received through the hitch structure 13 while the tractor is being backed, the contracted ram 78—82 enables the cable flights 56 and 56' to permit swinging of the hitch 13 and the front axle 29 of the trailer about the vertical king pin axis a—a to facilitate steering of the trailer. The slack cable flights 88 and 88' enable the axle 29 to pivot about the fore and aft horizontal axis of the pivot pin 28 which connects this axle with the lower end of the king pin 24 whereby the front dirigible wheels 21 of the trailer are free to roll upon ground surfaces of different elevation. Strain upon the trailer frame 18 is thus avoided. If at any time the trailer becomes jackknifed relatively to the hitch structure as illustrated in Fig. 4 whereby the hitch structure is swung angularly to a vertical median plane of the trailer coincident with its median fore and aft axis b—b, this condition can be corrected by placing the tongue 34 and also the hydraulic ram 49—51 of the hitch structure 13 within such vertical median plane pursuant to shifting the front end of the trailer laterally. Assuming the trailer occupies the full line position illustrated in Fig. 4, hydraulic energization of the hitch structure 13 will cause lifting of the dirigible wheels 21 from the ground whereby the front end of the trailer is supported by the forwardly projecting portions of the tongue 34 and ram 49—51 bearing downwardly upon the connections thereof with the tractor 11. While the wheels 21 are thus elevated, hydraulic energization of the ram 78—82 for expanding it from the Fig. 5 position to the Fig. 6 position creates tautness in the cable flights 88—88' to place the axle 29 in a horizontal position. Concurrently this expansion of the ram 78—82 creates tautness in the cable flights 56 and 56' which is sufficient for placing the axle 29 perpendicularly to the median axis b—b of the trailer and placing the tongue 34 and the hitch ram 49—52 in a straight ahead position relatively to the trailer coincident with the vertical median plane containing the median axis position b'—b'. Such swinging of the tongue 34 relatively to the trailer causes the rear wheels thereof to roll slightly backwardly while the front wheels are shifted transversely to move the trailer from the full line position of Fig. 4 into the dotted line position of such figure. Subsequent to this attainment of fore and aft alignment of the tractor and trailer the vehicle train is again in condition for backing a substantial distance before jackknifing may again be incurred. Such correction of the jackknife condition by the hydraulic ram 78—82 and the cables 55, 55', 94, and 94' is an expedient way of realigning the vehicles and enables the vehicle train to traverse a narrow roadway much more easily than if realignment had to be accomplished by a series of reversal and steering maneuvers of the tractor.

Having thus described a single preferred embodiment of the invention with the view of clearly and concisely illustrating the same, I claim:

1. In a vehicle train, a tractor having a hitch attaching structure; a trailer comprising rear ground-engaging wheels, a front axle swingable about a vertical axis, and laterally spaced ground-engaging dirigible wheels mounted upon opposite ends of the axle; a tongue having a rear end portion adjacent said axle and a front end portion projecting forwardly therefrom; means pivotally connecting the rear end portion of the tongue with the axle for swinging movement about a horizontal axis; means universally pivotally connecting the front end portion of the tongue with the tractor hitch attaching structure, said tongue being swingable with the axle about said upright axis to impart steering movement to the dirigible wheels; means including said tongue for transferring weight of the trailer from the dirigible wheels through the hitch attaching structure onto the tractor attendant to raising the dirigible wheels from the ground cable flights respectively connected with opposite end portions of the axle and extending rearwardly therefrom; and means connected between rearward portions of such cable flights and the trailer and energizable at will to create tautness in respective of such flights for swinging said axle and the tongue in respectively opposite directions about the upright axis to displace the dirigible wheels transversely of the tractor while such wheels are raised.

2. In a vehicle train, a tractor comprising a hitch attaching structure; a trailer comprising rear ground-engaging wheels, and front dirigible ground-engaging wheels beneath a forward portion of such trailer; a tongue projecting forwardly from the trailer forward portion and having a front end portion; means effecting a universal pivotal connection of the tongue front end portion with the tractor hitch attaching structure, the trailer having a fore and aft vertical median plane, the tongue being swingable about an upright axis substantially coincident with said median plane within the forward portion of the trailer attendant to movement by the tractor of the front portion of the tongue to either side of said plane; means connecting the tongue with the dirigible wheels to impart dirigible movement thereto pursuant to such lateral swinging of the tongue; means including said tongue for transferring weight of the trailer from the dirigible wheels through the hitch attaching structure onto the tractor attendant to raising the dirigible wheels from the ground; cable holding means on the trailer forward portion at respectively opposite sides of the median plane; cable flights leading respectively from said holding means and connected with said tongue, said cable flights being normally slack to avoid trammeling lateral swinging of the tongue about said upright axis, and means for concurrently placing the cable flights under tension for swinging the tongue into coincidence with the median plane to transfer the dirigible wheels transversely of said plane while such wheels are raised.

3. In a vehicle train, a tractor having a hitch attaching structure; a trailer comprising rear ground-engaging wheels, a front axle swingable about a vertical axis, and laterally spaced ground-engaging dirigible wheels mounted upon opposite ends of the axle; a tongue having a rear end portion adjacent said axle and a front portion projecting forwardly therefrom; means pivotally connecting the rear end portion of the tongue with the axle for swinging movement about a horizontal axis; means universally pivotally connecting the front end portion of the tongue with the tractor hitch attaching structure, said tongue being swingable with the axle about said upright axis to impart steering movement to the dirigible wheels; means including said tongue for transferring weight of the trailer from the dirigible wheels through the hitch attaching structure onto the tractor attendant to raising the dirigible wheels from the ground; cable holding means on the trailer at respectively opposite sides thereof laterally of such trailer with respect to said vertical axis and upwardly and rearwardly with respect to the front axle; cable flights leading respectively from said holding means and connected with portions of the axle on the same lateral side of the trailer as the respective holding means, the cable flights being normally slack to avoid trammeling pivoting of the axle and lateral swinging of the tongue about said upright axis; and means for concurrently placing the cable flights under tension for pivoting the axle and swinging the tongue to place the latter in substantially a straight ahead projecting position with respect to the trailer.

4. A towable vehicle comprising a body having a fore and aft vertical median plane, rear ground-engaging wheels in support of a rear portion of said body and disposed upon opposite sides of said plane, a front axle swingable about a vertical axis coincident with the median plane within a forward portion of said body, front dirigible ground-engaging wheels mounted upon opposite ends of the axle and at opposite sides of said plane, a weight transfer towing structure comprising a tongue connected with said axle for swinging therewith about said axis and projecting forwardly from the axle, said tongue being swingable alternately between positions upon opposite sides of the median plane for swinging the axle and thus imparting steering movement to the dirigible wheels, cable holding means on said body at opposite sides of the plane and spaced lengthwise of the body from said axle, cable flights leading respectively from said holding means and connected with portions of the axle on the same lateral side of the body as the respectively associated holding means, the cable flights being normally slack to facilitate swinging of the tongue and axle, and means for concurrently placing the cable flights under tension to place the axle transversely of the plane and the tongue substantially into coincidence with such plane.

5. A towable vehicle comprising a body having a fore and aft vertical median plane, rear ground-engaging wheels in support of a rear portion of said body and disposed upon opposite sides of said plane, a front axle having opposite end portions and a center portion connected with a forward portion of said body for swinging about a vertical axis coincident with the median plane and also for swinging about a horizontal axis disposed perpendicularly to such axle, front dirigible ground-engaging wheels mounte dupon the opposite end portions of the axle and at opposite sides of the median plane, a weight transfer towing structure comprising a tongue connected with said axle for swinging therewith about the vertical axis and projecting forwardly from the axle, a first cable holding means on said body at opposite sides of the median plane and spaced lengthwise of the body from said axle, cable flights leading respectively from said holding means and connected with portions of the axle spaced laterally outward from said plane, the cable flights being normally slack to facilitate swinging of the tongue and axle about the vertical axis, second cable holding means on the body above the axle, additional cable flights leading from the second holding means respectively to portions of the axle spaced laterally outward from said plane, the additional cable flights being normally slack to facilitate swinging of the axle about said horizontal axis, and means on said body for concurrently placing all of the cable flights under tension to place the axle in a horizontal position and to place the tongue substantially in coincidence with the median plane.

6. A towable vehicle comprising a body having a fore and aft vertical median plane, rear ground-engaging wheels in support of a rear portion of said body and disposed upon oposite sides of said plane, front dirigible ground-engaging wheels in support of a forward portion of such vehicle and also upon opposite sides of the median plane, a weight transfer towing structure comprising a tongue projecting forwardly from the body forward portion, said tongue being swingable about an upright axis substantially coincident with said median plane within the body forward portion attendant to movement of a front portion of the tongue alternately between positions upon opposite sides of the median plane, means connecting the tongue with the dirigible wheels to impart steering movement thereto pursuant to such lateral swinging of the tongue, cable holding means on said body at opposite sides of the plane, cable flights extending respectively from said holding means, means operably connecting extending portions of the cable flights with the tongue, said cable flights being operable when concurrently placed under tension to swing the tongue into a straight ahead position substantially coincident with said plane, a hydraulic ram mounted on said body, cable receiving sheaves mounted upon opposite ends of the ram and moved apart by the ram attendant to expansion thereof, each of said cable flights having an extending portion leading from the holding means associated therewith to the separable sheaves and including convolutions thereabout which are expandable to place said cable flights under tension when the ram is expanded.

7. A towable vehicle comprising a body having a fore and aft vertical median plane, rear ground-engaging wheels in support of a rear portion of said body and disposed upon opposite sides of said plane, a front axle having opposite end portions and a center portion connected with a forward portion of said body for swinging about a vertical axis coincident with the median plane and also for swinging about a horizontal axis disposed perpendicularly to such axle, front dirigible ground-engaging wheels mounted upon the opposite end portions of the axle and at opposite sides of the median plane, a weight transfer towing structure comprising a tongue connected with said axle for swinging therewith about the vertical axis and projecting forwardly from the axle, a first cable holding means on said body at opposite sides of the median plane and spaced lengthwise of the body from said axle, cable flights leading respectively from said holding means and connected with portions of the axle spaced laterally outward from said plane, the cable flights being normally slack to facilitate swinging of the tongue and axle about the vertical axis, second cable holding means on the body above the axle, additional cable flights leading from the second holding means respectively to portions of the axle spaced laterally outward from said plane, a hydraulic ram mounted on said body above the axle and expandable to displace a portion thereof more distantly from said second cable holding means, cable receiving sheaves mounted upon opposite ends of the ram for being moved apart lengthwise of the ram attendant to expansion thereof, the first named cable flights having extending portions leading from the first cable holding means to the separable sheaves and including convolutions about said sheaves to be expanded thereby to place the first named cable flights under tension when the ram is expanded, and said additional cable flights having extending portions leading from the second holding means into connection with said displaceable portion of the ram for placing the additional cable flights under tension when the ram is expanded.

References Cited in the file of this patent

UNITED STATES PATENTS 2,360,902     Simmons _____ Oct. 24, 1944